UNITED STATES PATENT OFFICE.

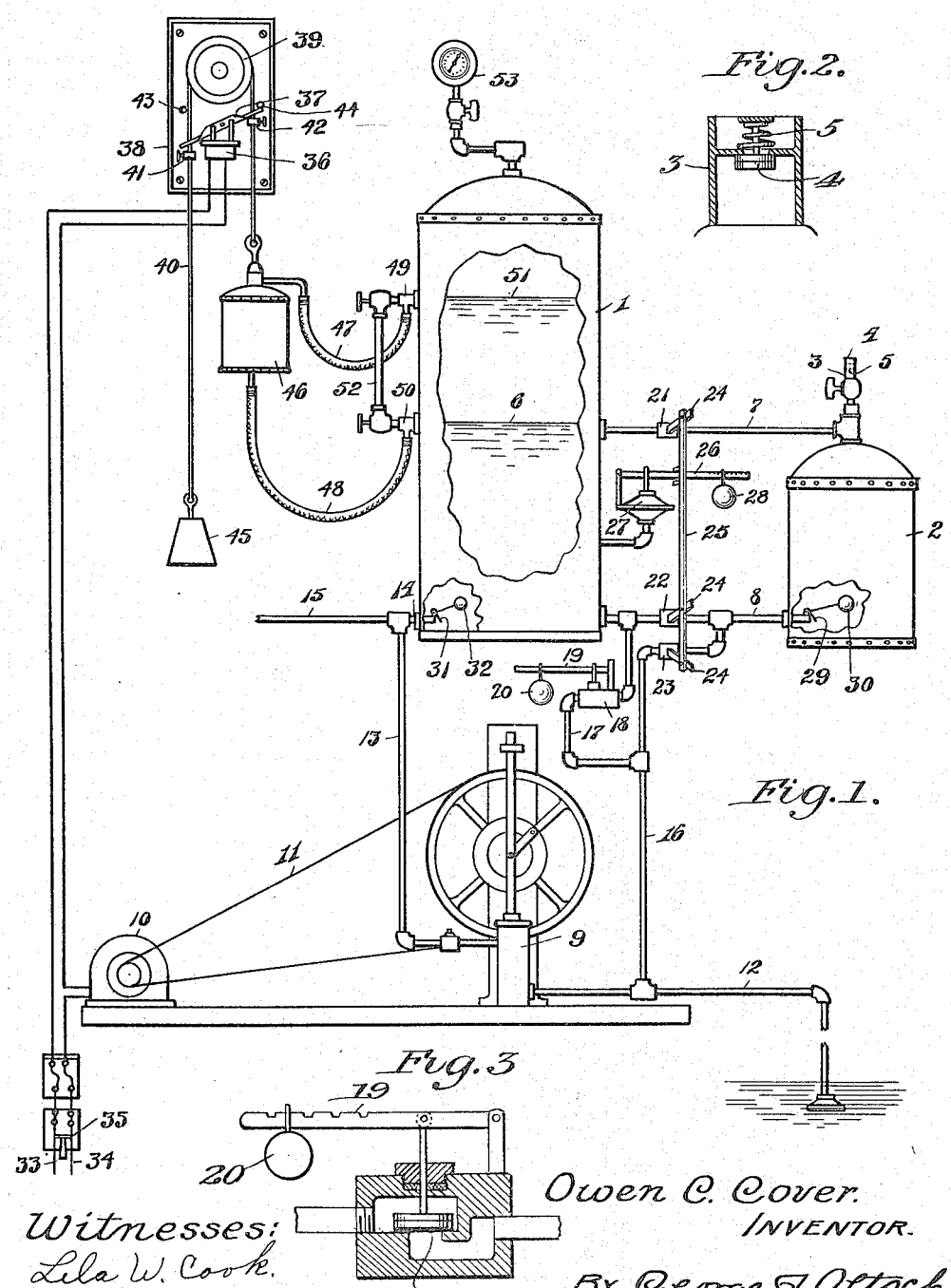

OWEN C. COVER, OF GOSHEN, INDIANA.

HYDROPNEUMATIC WATER SYSTEM.

1,129,334.  Specification of Letters Patent.  Patented Feb. 23, 1915.

Application filed May 26, 1913. Serial No. 770,012.

*To all whom it may concern:*

Be it known that I, OWEN C. COVER, a citizen of the United States, residing at Goshen, in the county of Elkhart and State of Indiana, have invented certain new and useful Improvements in Hydropneumatic Water Systems, of which the following is a specification.

The invention relates to a hydro-pneumatic water system of that type wherein the water for delivery to the point of use is stored in a tank and normally under a predetermined air pressure.

The main object of the present invention is the utilization, in such a system, of a float valve for automatically controlling the pump or similar mechanism, said float valve being operated directly by the water level within the main or supply tank, but being located wholly exteriorly of said tank.

A further object of the invention is the provision of means for automatically compensating for pressure within the main tank exceeding the predetermined maximum, and for preventing the escape of the air under pressure in the main tank into the service pipes in the event of failure of the water supply to the main tank.

The invention will be described in the following specification with particular reference to the accompanying drawing, in which:—

Figure 1 represents diagrammatically the improved system. Fig. 2 is a detail sectional view of an air valve. Fig. 3 is a detail sectional view of a fluid pressure valve.

In the system shown in the drawings, wherein the details are illustrated in the most preferred form, 1 represents the main or supply tank, of a size commensurate with the service desired, which tank is of the closed type used in such systems, and 2 the air-supply tank, the latter being also of the closed type, and open to the atmosphere through a pipe 3 provided with an inwardly-opening valve 4 normally held closed by a spring 5. The air-supply tank 2 is of materially less capacity than the main tank 1, and is so located that it is wholly below the normal water level of the main tank, which level is indicated at 6. The tanks 1 and 2 are in communication with each other through pipes 7 and 8, the former being in line with the normal water level of tank 1 and the latter establishing communication between the tanks at their extreme lower portions.

9 represents a pump operated, in the instance shown, from a motor 10, through the medium of belt 11. The inlet 12 to the pump leads from any suitable source of water supply while the outlet 13 communicates with the main tank 1 near the bottom thereof through a pipe section 14. The pipe section 14 also serves as an outlet from the tank 1 to the service pipe 15. An auxiliary supply pipe 16 leads from the pump inlet 12 to the pipe 8 intermediate the tanks 1 and 2, and a by-pass 17 communicates with the auxiliary supply 16 and with the pipe 8 adjacent the main tank 1, said by-pass being provided with a valve 18 normally held closed by a lever 19 under the influence of a weight 20 adjustable thereon.

The pipes 7 and 8, and an appropriately-arranged section of the auxiliary supply 16 are disposed in the same plane, said portions being provided with controlling valves, that is the pipe 7 is provided with a valve 21, the pipe 8 with a valve 22, and the pipe 16 with a valve 23. The respective valves are provided with operating arms 24, and these arms are, in the automatic type of system, connected by a rod 25 so that all of the valves are simultaneously actuated. The valves 21 and 22 have their arms 24 similarly connected to the rod 25, while the valve 23 has its arm 24 oppositely connected to the rod; that is to say, the valves when operated under the influence of the rod will be simultaneously actuated, with the valves 21 and 22 similarly operated while the valve 23 is reversely operated. Under this construction the valves 21 and 22 are always reversely positioned to the valve 23, so that at no time will the pipe sections 7, 8 and 16 be all opened or all closed. The rod 25 is controlled through a lever 26 operated through a diaphragm or other pressure device 27 open to the interior pressure of the main tank, the lever 26 being provided with a weight 28 adjustable thereon to control the trip pressure as is common in this class of devices. The pipe 8 projects within the tank 2, and is provided with a flap-valve closure 29 for its open terminal, which valve is connected to and operated by a lever-connected float 30. The open terminal of pipe section 14 is similarly provided within the tank 1 with a flap-valve 31 operated by a lever-connected float 32.

In the system illustrated I have shown the motive power as an electromotor 10, and in providing means for controlling the motor I govern the operation of the pump 9. The automatic control of the motive power is a salient feature of this invention. In the use of an electromotor in the system, the electric mains 33, 34 passing through the usual hand switch 35 are in circuit with the motor through an automatically-controlled switch 36. The detailed construction of this automatic switch is unimportant for the purposes of the present invention, though I have illustrated it as including the usual switch points adapted to be bridged or broken by an arm 37. The switch is mounted in a casing 38 supported adjacent to and above the main tank 1 and contains a sheave or pulley 39 over which is passed a cable 40 and on which are secured stops 41, 42 operating beneath the opposite extensions of the switch arm, so that as the cable passes over the pulley one or the other of the stops will actuate the switch arm. The casing is provided with fixed stops 43, 44, to limit the "off" and "on" position of the switch arm, and if desired the casing may have the usual indicator to denote the position of the switch arm. That section of the cable 40 carrying the stop 41 will, in the illustrated arrangement of the parts, on its upward movement cause the said stop 41 to engage and operate the switch arm to the "off" position, breaking the circuit to the motor, while that section of the cable carrying the stop 42 operates the arm to the "on" position to supply current to the motor. The section of the cable carrying the stop 41 is terminally provided with a weight 45, while that section of the cable carrying the stop 42 is terminally provided with a hollow receptacle 46, hereinafter termed the float control. The receptacle 46 when filled with water will overbalance the weight 45, while under other conditions the weight is in control of the cable. The float 46 is in open communication with the main tank 1 through upper and lower flexible connectors or hose pipes 47, 48, opening into opposite ends of the otherwise closed receptacle 46, and communicating respectively with nipples 49, 50 opening into the tank 1 at the maximum water level, indicated at 51 and the normal water level indicated at 6. If desired the nipples 49 and 50 may have a glass gage connection beyond the connection of the hose pipes thereto, as at 52, and the tank 1 may be provided with an ordinary pressure gage 53.

In the initial starting of the system the lever 26 is down owing to lack of pressure in the tank with the valves 21 and 22 open and the valve 23 closed. The current being cut in, the pump is started and continued in operation until the tank 2 is completely filled and the normal water level reached in tank 1. The lever 26 is then raised to close valves 21 and 22 and open the valve 23. The pump will now transfer the water from tank 2 to tank 1 and at the same time replace the water of tank 2 with air drawn in through the valve 4. When the water in tank 1 is nearly at the maximum level the lever 26, which would now be held in raised position due to water pressure on the diaphragm 27, is manually lowered and held against said pressure again opening valves 21 and 22 and closing valve 23. The weight of water in the tank 1 will cause the air in tank 2 to be displaced by water from tank 1, said air being forced into tank 1 above the level of the water therein. As the valve 23 is closed the pump continues to deliver the water into the tank 1, and when the level in tank 1 reaches the maximum predetermined line as 51, it will have filled the receptacle 46, overcome weight 45, drawn down the cable section carrying stop 42, and cause the stop 41 to throw the switch arm to "off" position, stopping the motor and pump. On opening the service pipe the water will be drawn therefrom under the air pressure in tank 1, the lowering of the water level in tank 1 correspondingly emptying the receptacle 46, aided by the admission of air thereto, until the weight 45 resumes control and operates the switch arm through the stop 42 to again energize the motor.

When water level in tank 1 falls to normal level (6) with air pressure about as desired, float tank empties into tank 1, thereby allowing counterweight 45 to start motor, the valves 21 and 22 being closed and 23 open, and valve 18 closed, the counterweights 20 and 28 being adjusted to obtain this condition. When water level in tank 1 falls to normal level (6) with air pressure deficient, float switch acts as above noted, weight 28 opens valves 21 and 22 and closes valve 23, valve 18 remaining closed. Valves 21, 22 and 23 remain in this position until pump has supplied sufficient water to raise level in tank 1 to maximum or cut-out point for the float switch. The resulting increase of pressure (free air in tank 2 having in the meantime been compressed and passed into tank 1 by gravity of the water in tank 1) causes diaphragm 27 to overcome weight 28 and close the valves 21 and 22 and open valve 23. The water in tank 2 will now flow to pump by gravity, thereby filling tank 2 with free air for the next charge. Excessive pressure can only occur when water is above level 51 in tank 1, caused by the failure of float switch to work. When float switch fails to shut off power, relief valve 18 opens discharging to pump supply line, and the pressure in tank 1 can thus not be increased as the entire supply for the pump will come from tank 1, the pump merely circulating the water already contained in the tank.

If the use of the water exceeds the combined capacity of the pump and tank 1, the valve 29 in tank 2 will prevent the pump taking air from said tank, in an obvious manner; while if the pressure becomes too high or the electric switch fails to cut out the motor the by-pass 17 permits the water in tank 1 to simply circulate through the pump. If the power fails and the service pipes are opened the tanks 1 and 2 will supply the water until the valve 31 automatically closes, this operation preventing the escape of air to the service pipes and insuring a restoration to normal conditions as soon as the power is restored.

It is particularly important that all the air in tank 2 be excluded by the water delivered from the main tank, and hence the extreme upper end of the tank 2 must be below the normal water level of tank 1, for the reason that should any air remain in the tank 2 during the attempted filling of the same with water, such air would be of course under pressure, and in its expansion as the water is drawn from tank 2 would tend to prevent entrance of air past the valve 4.

As a result of my system all of the parts are readily accessible for adjustment and repair, for which reason they are more efficient in operation, less expensive to construct and more simple and convenient to adjust when different water levels are required. Furthermore, the improved system will operate efficiently with a high-speed centrifugal pump though such are ordinarily precluded in systems of this type owing to the fact that their efficiency, as compared with piston pumps is very materially reduced where air is entrained in the supply water. If in my system the air should collect in the casing of the centrifugal pump, and the latter fail to pump water, the pressure in the main tank would immediately fall and water from tank 2 would flow by gravity into the pump casing, displacing the air, and starting the pumping supply.

Having thus described my invention, I claim:—

1. In a hydro-pneumatic water system, a main service tank, an air supply tank, means for delivering water to said tank, means for transferring the water from the air tank to the service tank to create a vacuum in and draw air into the air tank, and means for retransferring water from the service to the air tank to force the contained air from the latter into the former tank and to subsequently return the water from the air to the service tank, whereby the air in the service tank will be brought under compression.

2. In a hydro-pneumatic water system, a main service tank, an air supply tank, air inlet means for the air supply tank, means for delivering water to both of said tanks, means for transferring the water from the air tank to the service tank, means permitting the inflow of air into the air tank upon withdrawal of the water therefrom, means for retransferring the water from the service to the air tank to force the contained air from the latter into the former tank, and pressure controlled means controlling the delivery of an additional supply of water to the service tank to bring the air therein under compression.

3. In a hydro-pneumatic water system, a main service tank, an air supply tank, air inlet means for the air supply tank, means for delivering water to both of said tanks, means for transferring the water from the air tank to the service tank, means permitting the inflow of air into the air tank upon withdrawal of the water therefrom, means for retransferring the water from the service to the air tank to force the contained air from the latter into the former tank, and means controlled by the combined volume of water and air pressure in the service tank controlling said water delivering means.

4. In a hydro-pneumatic water system, a main service tank, an air supply tank, pipe connections between said tanks, a valve in each pipe, fluid pressure means, an open pipe connection between said means and the main tank, a pipe connection between said means and one of the pipe connections between the tanks, a valve in said pipe, the valves of the pipe connections between the tanks and of the connection between the fluid pressure means and one of said pipe connections being joined for simultaneous movement.

5. In a hydro-pneumatic water system, a main service tank, an air supply tank in communication with the service tank, a fluid pressure means, in communication with said tanks, a motor for the fluid pressure means, and a float control for the motor, said float control being located exteriorly of and in communication with the main tank.

6. A hydro-pneumatic water system including a main service tank, a pump having communication with said tank, an air tank having communication with the service tank and with the pump, pressure controlled means regulating the flow of water from the service tank to the air tank to force the air from the latter into the service tank, a motor for the pump, and means arranged externally of the service tank and having fluid connection therewith to control the motor.

7. In a hydro-pneumatic water system, a main service tank, an air supply tank, air inlet means for the air supply tank, means for delivering water to both of said tanks, means for transferring the water from the air tank to the service tank, means permitting the inflow of air into the air tank upon withdrawal of the water therefrom, means for retransferring the water from the service to the air tank to force the contained air from the latter into the former tank, and pressure controlled means controlling said water delivering means.

8. In a hydro-pneumatic water system, a main service tank, an air supply tank, means for delivering water to both of said tanks, means for controlling the delivery means to cause the latter to force the water from the air supply tank to the main service tank, air inlet means for the air supply tank, and connections intermediate said tanks to permit the water from the main service tank to force the contained air from the air supply tank to the main service tank.

9. In a hydro-pneumatic water system, a main service tank, an air supply tank, valved communications between said tanks at different levels, a pump, a pump outlet in communication with the service tank, a valved communication between the pump and air supply tank, and means for simultaneously operating all of the valves of said valved communications.

10. In a hydro-pneumatic water system, a main service tank, an air supply tank, valved communication between said tanks at different levels, a pump, a pump outlet in communication with the service tank, a valved communication between the pump and air supply tank, and means for simultaneously operating all of the valves of said valved communications, said means including a regulatable pressure element open to the main service tank.

11. In a hydro-pneumatic water system, a main service tank, an air supply tank, valve communication between said tanks at different levels, a pump, a pump outlet in communication with the service tank, a valved communication between the pump and air supply tank, and means for similarly operating the valves of the communications between the tanks and simultaneously and reversely operating the valve in the communication between the pump and air supply tank.

12. A hydro-pneumatic water system including a main service tank, an air supply tank, pumping means having communication with both of said tanks, an air inlet for the air supply tank, pipe connections between said tanks, valves in said pipe connections and means for actuating said valves to initially supply both tanks from the pump and after the operation has been established to transfer the water from one tank to the other, said means being subject to pressure control in the latter operation.

13. A hydro-pneumatic water system including a main service tank, an air supply tank, pumping means having communication with both of said tanks, an air inlet for the air supply tank, pipe connections between said tanks, valves in said connections and pressure control means for actuating said valves to initially supply both tanks from the pump and after the operation has been established to transfer the water from one tank to the other, said pressure control means reversing the valves subsequent to the transfer of water from one tank to the other to permit the contained water from one tank to force the entrapped air from the other tank into the water contained tank.

In testimony whereof I affix my signature in presence of two witnesses.

OWEN C. COVER.

Witnesses:
CHESTER D. MERRIMAN,
MERVIN L. CREGIER.

Copies of this patent may be obtained for five cents each, by addressing the "Commissioner of Patents, Washington, D. C."